United States Patent [19]
Jenkins

[11] 3,846,879
[45] Nov. 12, 1974

[54] METHOD OF CONSTRUCTING A MULTI-PLATE ELECTRODE STRUCTURE
[75] Inventor: Jonathan Moubray Jenkins, Sevenoaks, England
[73] Assignee: Unigate Limited, London, England
[22] Filed: Mar. 8, 1973
[21] Appl. No.: 339,453

[30] Foreign Application Priority Data
Mar. 9, 1972 Great Britain.................... 11099/72

[52] U.S. Cl.......................... 29/2, 29/527.2, 29/592, 136/67
[51] Int. Cl............................................. B23p 17/04
[58] Field of Search......... 29/2, 527.2, 592; 136/36, 136/67

[56] References Cited
UNITED STATES PATENTS
3,516,864  6/1970  Willmann........................ 136/36 X
3,621,543  11/1971  Willmann et al. ........................ 29/2
FOREIGN PATENTS OR APPLICATIONS
1,258,502  12/1971  Great Britain........................ 137/67
1,258,503  12/1971  Great Britain........................ 137/67

Primary Examiner—C. W. Lanham
Assistant Examiner—D. C. Reilly, III
Attorney, Agent, or Firm—Sughrue, Rothwell, Mion, Zinn & Macpeak

[57] ABSTRACT

A method of making an electrode structure for use in an electric cell, comprising feeding a ribbon of a substrate carrier material to a layering device, applying to spaced areas of the carrier material a spread of electrode material to form spaced layered areas thereon, causing the spread to become attached to the carrier material, deforming the layered carrier material to form layered areas thereof in substantially opposing relationship interconnected by layer free areas, and locating at least some of the layer free areas in support means to form a multi-plate electrode structure. The carrier material is preferably reticulated material inert to the cell materials, and may be expanded metal of Groups IV(A) and V(A) of the Periodic Table of Mendeleef, e.g. titanium, and the electrode material spread may be a paste-like electrically conducting material incorporating porous carbon for example a particulate carbon crumb with an inert binder such as polyvinyl polymer. The method is preferably continuous.

13 Claims, 9 Drawing Figures

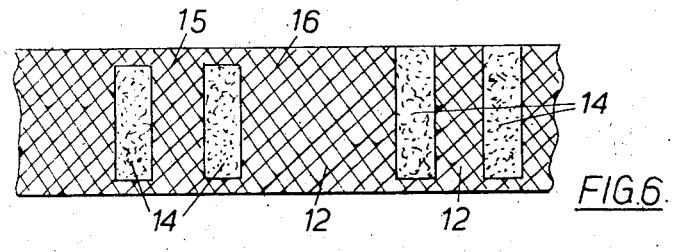
FIG.6.
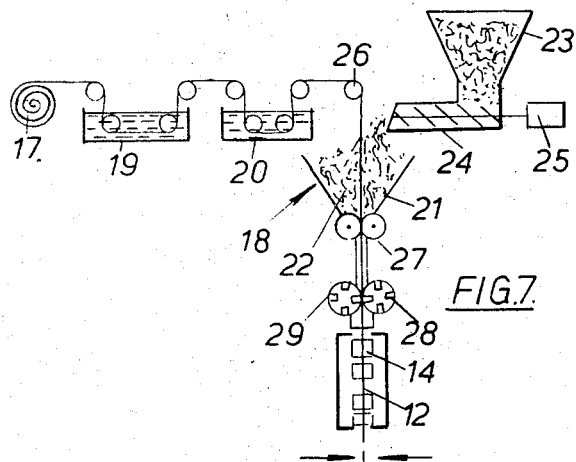
FIG.7.
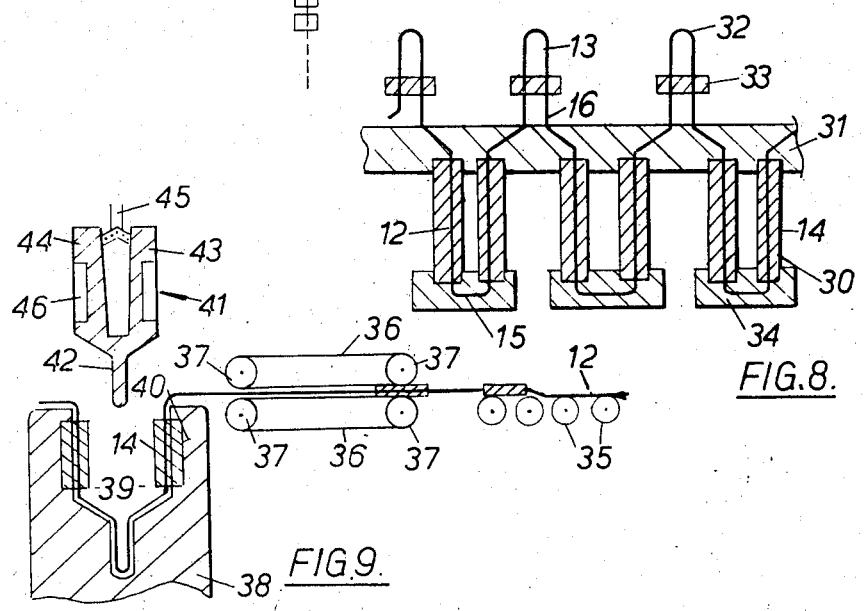
FIG.8.
FIG.9.

METHOD OF CONSTRUCTING A MULTI-PLATE ELECTRODE STRUCTURE

BACKGROUND OF THE INVENTION

1. Field of the Invention

This invention relates to electrodes for use in electric cells and batteries, and to methods of manufacturing such electrodes. The electrodes are primarily but not necessarily for use in zinc halogen cells and batteries and electrolysis cells for example such as are used in brine electrolysis and sewage and seawater treatment and like synthetic uses. In referring to zinc halogens herein and the appended claims, the term "halogen" means chlorine, bromine, iodine or a mixture of two or all of these three halogens.

2. Description of Prior Art

United Kingdom Letters Patent Nos. 1,258,502 and 1,258,503 describe electrodes for use in electric cells and batteries and primarily such cells and batteries which are rechargeable and used to produce electric current for example for driving electric motors used as prime movers. One of these electrodes is made of electrode structures each of which comprises a substrate of anodizable metal selected from the metals of Group IV(A) and Group V(A) of the Periodic Table according to Mendeleef having permanently associated therewith at least one coherent stratum of substantially porous carbon.

For electric cells and batteries, electrodes are frequently made individually and where they are of composite material such as a paste pressed onto a plate or grid, the plate or grid acts as a support for the paste constituting the electrode material and may form or be connected to an electrical connector for connecting the electrodes into an electric circuit which includes the cells or batteries. Such known methods are slow and costly to carry out and also the time and cost of mounting the electrodes on supporting means with which they are assembled into a container to form a cell or battery is substantial.

The main object of the present invention is to provide a method of making electrodes for zinc halogen cells and batteries in which these disadvantages are reduced or minimised.

SUMMARY

According to the present invention a method of making an electrode structure for use in an electric cell, comprises applying a spread in the form of a coat or layer of electrode material incorporating a porous material to spaced areas of a deformable substrate carrier to form alternating layered and layer free areas of the carrier, deforming the carrier to dispose layered areas thereof in spaced substantially face-to-face relationship interconnected by layer free carrier areas, and locating at least some of said layer free areas in support means to form a multiplate electrode structure.

The carrier is preferably in strip or ribbon form and may be of reticulated material e.g. expanded metal, or an open mesh of the metal or other solid material inert to the cell materials and the electrode material is caused to adhere mechanically or adhesively to the strip.

The carrier is preferably of anodizable metal selected from the metals of Group IV(A) and Group V(A) of the Periodic Table according to Mendeleef or an alloy of two or more or all of said metals.

Where the carrier is of metal, this may be etched, heat treated or treated by other techniques to cause an increase in metallic crystal size.

Preferably the electrode material is a paste of electrically conducting material incorporating a porous material e.g. porous carbon or is of particulate carbon e.g. a friable crumb containing a binder such as polyvinyl polymers.

The layer free areas of the carrier are preferably mounted onto or moulded into a synthetic plastics supporting plate of insulating material such as polyethylene.

BRIEF DESCRIPTION OF THE DRAWINGS

FIG. 6 shows diagrammatically a substrate to which electrode material has been applied in predetermined areas;

FIG. 7 is a line diagram showing one way of applying the electrode material to the substrate strip;

FIG. 8 shows the strip with the applied electrode material formed in supports to make an electrode structure forming a number of electrodes side by side, and FIG. 9 is a diagrammatic representation of one means for folding the layered carrier.

DESCRIPTION OF PREFERRED EMBODIMENT

Figure 1:
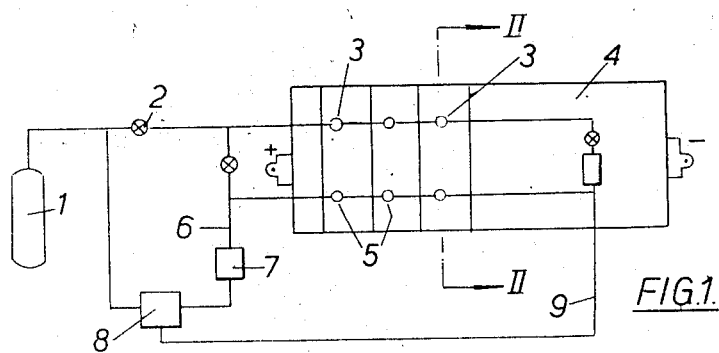
FIG. 1. is a line diagram of a zinc halogen battery in which the electrodes of the invention may be used.

Referring to the drawings the same references are used to designate the same or similar parts. The constructions described with reference to the drawings relate to a zinc-chlorine battery or cell, but the halogen may be iodine or bromine or a mixture of two or three of these halogens, with modifications to design according to known working conditions in different types of halogen batteries and cells.

FIG. 1 shows a cell or battery chlorine circuit with a chlorine cylinder 1 connected through a pressure regulator valve 2 to gas inlets 3 of the battery 4. Gas outlets 5 are connected to a line 6 leading back to the cylinder 1 through an ultra-violet lamp 7 and a halogen liquifier 8. The lamp 7 is close to the pipe 6 and operates to effect removal of the halogen gas and convert it to hydrochloric acid which is returned by a pipeline 9 to the electrolyte of the battery together with condensed water vapour and liquid carry over. Using chlorine the electrolyte is zinc chloride in aqueous form and to assist in the reduction of dendrite formation some mercury, indium, tin or gallium may be included. Such a battery is suitable for example for driving vehicles powered by electric motors.

Within the battery two types of electrodes are used, each anode being formed as a substrate carrier having electrode material supported thereon (to be described) and the cathode being a zinc substrate with an electrode substance supported thereon and having separators secured to it or mounted with it. The anodes are seen at 10 and the cathodes at 11.

Each anode 10 comprises a substrate carrier 12 of an anodizable metal of Groups IV(A) and V(A) of the Periodic Table according to Mendeleef such as titanium, tantalum or zirconium or alloys of any two or all of these metals, but titanium is preferred and the detailed description herein refers to titanium by way of example.

The substrate carrier is of open mesh such as expanded metal or a wire mesh of metals and has a portion 13 which extends outside the electrode structure to form an electrical connection in the cell or battery. Carried by the substrate carrier is a mass of carbon 14 of such porous nature that in the battery in use the chlorine ions can migrate freely therethrough in the electrolytic process. The carbon may be in the form of lamp black or other finely divided form or carbon granules or other particulate form such as a friable crumb, preferably bonded together to form a mass with a synthetic resin such as polyvinyl chloride or other polyvinyl polymers inert to the zinc chloride electrolyte and chlorine gas; other binders may be polyethylene, polytetrafluoroethylene, synthetic rubber, rubber or silicones and liquid expoxy resins cast in situ on the carrier substrate during its application to the carrier substrate as hereinafter described.

The binder and the carbon may be homogeneously mixed in any suitable manner as by tumbling using a heated drum or granulator. Small slices of carbon or graphite may be impregnated with a latex or solution of resin to act as an impervious barrier between cells in the battery and for this purpose small slices of carbon may be bonded into a larger sheet as by injection moulding to give a flexible anode.

An active surface may be imparted to the carbon surface using an activated carbon powder such as acetylene black with a solution of a resin such as polyethylene in carbon tetrachloride or ethylene trichloride. In this case an inert filler such as zinc chloride or zinc oxide may be added which is subsequently leached out to improve the porosity of the electrode. The carbon may be activated as by heating to 400°C in an inert gas such as argon or carbon dioxide or it may be in chlorine itself.

The optimum carbon particle size is dependent on providing high surface area but the particles must be capable of cohering naturally or with the binder. If polychloroprene is used a suitable particle size is 50 m$\mu$ to 190 m$\mu$. Quaternary ammonium salts may be used as a surfactant. Silica gel may be added to improve the chlorine storage.

The current collector 13 makes electrical contact through the carbon and extends outside the carbon mass.

The carbon and binder may be bonded together and compounded using acetylene black wetted with about ten times its weight with water at about 50°C to which a drop or two of acetone may be added. As an example 50% nitrile resin latex material is diluted about ten times with cold water and added slowly while stirring to the carbon: the stirring should be vigorous and thorough but care must be taken not to beat the mixture and to cease the stirring as soon as all the resin has been absorbed and a crumb has formed. Best results have been obtained with the resin comprising from 5% to 25% by weight of the bonded mixture. The correct particle size of the latex should be selected which will produce the optimum conductivity to strength values for the three dimensional mesh of resin in which the carbon is held. The nitrile resin hardens on chlorination thus setting the electrode structure in situ.

The resultant electrode structure is preferably between 30% and 50% porous.

To improve the adhesion of carbon to the metal substrate, the latter may be treated by etching in a 4% solution of ammonium bifluoride and subsequently kept covered with water or by dilute hydro chloric acid until the carbon is pressed onto the substrate; alternatively the substrate of metal can be plated with platinum by any known method or the substrate can be nitrided.

Figure 2:
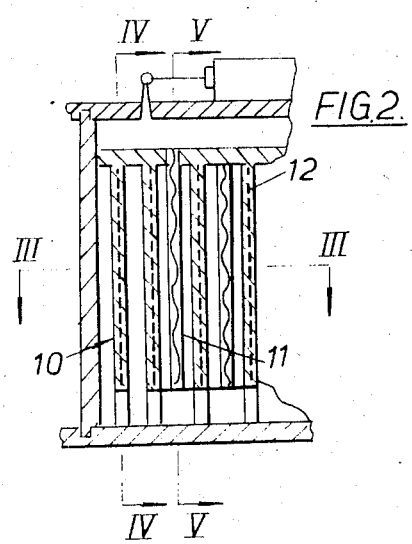
FIG. 2 is a diagrammatic cross section on an enlarged scale on the line II—II of FIG. 1 looking in the direction of the arrows.
Figure 3:
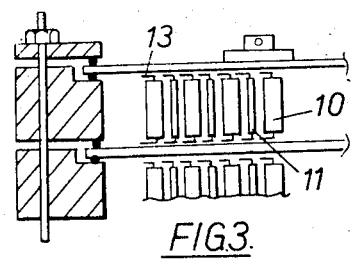
FIG. 3 is a cross section on the line III—III of FIG. 2 looking in the direction of the arrows.
Figure 4:
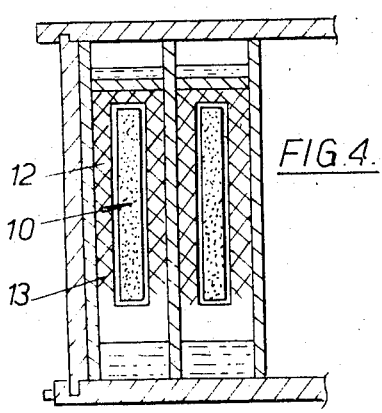
FIGS. 4 and 5 are respectively cross sections on the lines IV—IV and V—V of FIG. 2 looking in the direction of the arrows.
Figure 5:
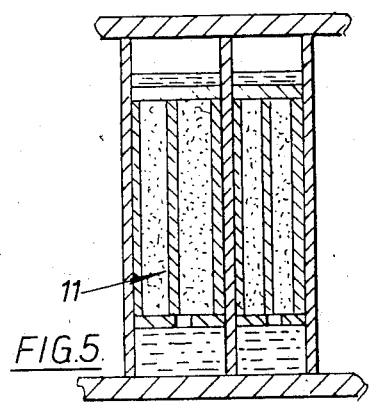

The electrode structures of FIGS. 2 to 4 are shown as similar to those in United Kingdom Specifications Nos. 1,258,502/3 and the cells or battery is made up in general layout and arrangement as described and shown in those Specifications. However in making such electrodes particularly the anionic electrodes whether they be made in a known manner or as described in those prior Specifications, they are frequently made individually and all these methods are slow and costly to carry out and further costs are involved in mounting the electrodes in supporting means with which they are assembled into the cell and/or battery containers.

Referring to FIGS. 6 to 8 these show the process of this invention by which mass production is more feasible, the electrical resistance between joints and between the cells in a battery is minimised, and welding troubles, oxidation of the carrier substrate metal and a risk of embrittlement of the materials of the electrode are kept to a minimum.

FIG. 6 shows a substrate carrier in the form of a strip 12 for example of expanded titanium or other open mesh or reticulated form. To spaced areas of this strip an electrode material is applied in the form of a layer. Each layer 14 is shown as parallel to the other layers 14 and in FIG. 6 the layers are shown in pairs separated by free substrate areas 15 while the pairs of layers 14 are separated by wider free substrate areas 16.

The layers in the form of strips 14 can be layed short of the longitudinal edges of the carrier strip or they can extend up to one or both of the opposite edges of the carrier strip.

The electrode material is preferably applied to the strip in the form of a particulate carbon crumb mixed with a synthetic plastics binder such as polyethylene, polyvinylchloride or polytetrafluoroethylene or a rubber or synthetic rubber. The mix is formed into a pasty consistency and is applied to the strip so as to be held thereon in the form of a layer.

One method of applying the mix to the strip is shown in FIG. 7. The strip is drawn from a roll 17 and passed to a coating apparatus indicated generally at 18. If desired, as shown, the strip is passed continuously through an etching solution tank 19 which cleans it and is then washed by passing through a flushing tank 20. In these tanks the crystal size of the metal is increased by etching and/or by heating in an oven, and also the internal stress of the carrier substrate is reduced.

The coating apparatus has a container or hopper 21 into which the electrode material 22 is fed continuously from a hopper 23 by a screw conveyor 24 driven by a prime mover 25 such as an electric motor. The strip is drawn continuously over an idler roll 26 through the mix in the hopper 21 and between feed rolls 27 which close the hopper bottom. The gap between the rolls and the pressure they exert on the strip are selected to provide the desired thickness of the layer of the mix on the strip. These rolls carry mix from the hopper 21 downwardly out of the hopper in contact with both surfaces of the strip.

Below the feed rolls 27 is a pair of pressure rolls 28 between which the strip with the mix layer or layers moves. These rolls and/or the feed rolls 27 may be hollow and connected to a source of reduced pressure which sucks out any moisture or proportion of the moisture in the mix to aid in its adherence to the strip. This is particularly advantageous when the mix is in the form of a slurry in water or other liquid. Care has to be taken to prevent or minimise the adhesion of the mix to the feed and/or pressure rolls. For optimum results the rolls may be contoured and provided with hollows 29 into which the layer portions 14 of the mix engage leaving the areas 15, 16 of the strip 12 free of mix.

The elctrode material may be applied to the areas of the strip by other suitable methods: for example the mix may be formed as a slurry and sprayed onto the strip using a heavy duty slurry spraying apparatus, or the mix may be preformed into a sheet and pressed, e.g. between pressure rolls, onto the strip. By use of the pressure rolls or by the spraying conditions when spraying a slurry, the binder may adhere to the surface of the metal of the strip or may be forced onto the strip so that the material is mechanically anchored by gripping round the mesh elements of the strip: the strip may in fact be thus embedded into the carbon material. The coated strip may be coated a second or more times with a layer of the electrode material if desired and the separate coating layers may be formed of different mixes, the whole of the finished coated strip being porous to the chlorine gas.

The mix is preferably cured prior to application to the strip as by prechlorination by anodising, but it may be cured by heat treatment in an oven 29, or the cure or the final cure may be effected in the battery or cell in contact with the chlorine gas.

After the electrode material is firmly adhering to the strip the strip is folded to the form shown in FIG. 8 with the areas 15 at right angles to the coated layers 14 thereby disposing the layer 14 in parallel relationship and separating them from each other. By virtue of the arrangement of the layers 14 in pairs an electrode structure 30 is thus formed.

The strip portions 12 extending out of the carbon areas 14 are embedded in a support 31 as by inset moulding into a synthetic plastics material and on the opposite side of the support 31 the layers 14 are bent at 32 in the form of a loop and may be sealed as by inset moulding into a spacer member 33. The portions 15 are also supported as by inset moulding by spacer members 34. The inset moulding may be by any known technique.

It will be understood that the strip may be folded in any way even across part of the coated layers 14 so that in fact the electrode layers 14 are not necessarily parallel providing they are separated from each other.

To fold the layered strip, the strip is advanced by known means such as on a conveyor belt or between rollers or on rollers to a folding mechanism. Any suitable folding mechanism may be employed and by way of example one such mechanism is shown in FIG. 9. In FIG. 9 the layered strip carrier 12 is fed from the apparatus of FIG. 7 over rollers 35 at least some of which may be driven: alternately the carrier may be advanced between two parallel endless belts 36 one or both of which may be driven by the tumbler roller or rollers 37: as shown in FIG. 7 the carrier is both fed over the rollers 35 and between the belts 36. At the discharge end of the belts 36 a female mould member 38 is mounted for vertical movement, the inner surface of the mould cavity 39 having the desired configuration of the folded carrier, the walls of the cavity 39 have recesses 40 to receive the layers 14 on one side of the carrier. Above the mould member 38 is a male mould member 41, the lower end 42 being shaped to the bottom of the cavity 39 while its upper portion is formed of two parts 43, 44 each pivoted to the end 42 and pivotable by a toggle device 45. Each part 43, 44 has a cavity 46 to receive the layers 14.

In operation, when the carrier is advanced across the top of the mould cavity 39, the male member 41 is lowered with the parts 43, 44 tilted inwards by the toggle. As the member 41 enters the cavity it carries the carrier 12 downwardly so that the layers 14 enter the recesses 40 and then the toggle device 45 moves the portions 43, 44 outwardly with the layers filling both recesses 40, 46 and shaping the carrier; the toggle device then pivots the parts inwardly and the members 38, 41 are moved vertically in opposite directions to permit the carrier to be advanced for the next folding operation. Alternately the cavity 39 and the male member 41 may be formed on rotating members so that they intermesh or they may be mounted on travelling belts similar to the belts 36, the two mould parts intermeshing.

Where the layers 14 are inwardly spaced on the carrier from the longitudinal carrier edges, the belts 36 may be formed as two parallel ribbons each engaging the carrier edge portions free of the layers.

It will also be understood that the carbon layers 14 on the strip may be applied in any configuration so that when the strip is folded or otherwise deformed one does have the electrode plate-like elements 14. For example the electrode plates 14 may come to an apex and if required the two carbon layers 14 of one pair may be formed by a thicker strip folded at its mid-point. In such constructions it may be necessary to apply a thin line strip or bead of synthetic plastics material to the carbon coat to prevent the carbon coat cracking at the fold. Such cracks must be avoided as they would not otherwise form a gas tight structure.

If desired a spacer may be mounted between the electrode layers 14 of a pair although in most cases this is not necessary.

In securing the portion 15 of the strip into the supports 31 where the latter is of a mouldable plastics material, this may be effected by inset or injection moulding methods or it may be cast in a liquid plastic such as epoxy resin or silicone. A double walled inter cell membrane e.g. of titanium may be formed by these techniques thus providing spaces for a coolant, electrolyte solution or chlorine feed flow for the cell.

It will be appreciated by those skilled in the art that it is possible to seal one end of the space between adjacent portions 14 and at the other end between opposite portions 14 thus forming a common gas channel at what becomes the bottom of each cell which is closed at the top end.

The electrode structure thus formed continuously can be made with any number of portions 14 to suit the size of cell or battery to be made. When erected the loops 32 can be bent parallel to the support 31 so as to be disposed as shown at 13 in FIG. 3. The zinc electrodes 11 may similarly be coated onto a mesh as described for the anodic electrodes.

A similar method of construction may be employed for making other battery or secondary electric cell plates such as lead grids with lead oxide applied thereto.

By means of the invention any inter cell backing plate is eliminated in a battery which minimises the production cost. Further all joining or welding of the strips or other metals e.g. titanium parts of the cell, may be omitted. This cell construction improves the conductivity of the electrodes as the strip being electroconducting is continuous and there is the minimum of localised resistance due to welding and the corrosion of the metal at any weld is eliminated. A rigid structure is thus formed with the case of the cell or batteries which facilitates assembly and gives consistent performance of the batteries The use of the plastic support means eliminates any chance of failure due to corrosion or hydrogen embrittlement and facilitates forming the edge seal of each cell without the need for intercell separators.

I claim:

1. A method of making an electrode structure for use in an electric cell, said method comprising feeding a deformable substrate carrier to a coating apparatus, feeding to said coating apparatus an electrode material incorporating a porous material, applying said material in said coating apparatus as a spread onto at least one side of said carrier in spaced areas to form coated areas on said carrier separated by coating free areas of said carrier, causing said coating to become attached to said carrier, deforming said coated carrier to form coated areas in substantially opposing relationship interconnected by coating free carrier areas, and securing at least some of said coating free areas in support means, to form a multi-plate electrode structure.

2. A method according to claim 1 wherein said carrier is in ribbon form and is continuously advanced through said coating apparatus.

3. A method according to claim 1 wherein said carrier is made of material selected from open mesh metal, open mesh solid material inert to the cell materials, expanded metal, and reticulated solid sheet-like material.

4. A method according to claim 1 wherein said carrier is an anodizable metal selected from the group consisting of Groups IV(A) and V(A) of the Periodic Table according to Mendeleef and an alloy of at least two of said metals.

5. A method according to claim 1 wherein said carrier is made of a material selected from the group consisting of titanium, tantalum, zirconium and an alloy of at least two of said metals.

6. A method according to claim 1 wherein said carrier is made of a material selected from the group consisting of the metals of Groups IV(A) and V(A) of the Periodic Table according to Mendeleef and alloys of at least two of said metals and prior to application of said layers thereto is treated by a treatment selected from at least one of etching, heating, and other techniques which enlarge the crystal size of said metal.

7. A method according to claim 1 wherein said electrode material is a paste of electrically conducting material incorporating porous material, said porous material is a material selected from the group consisting of porous carbon, porous particulate carbon and friable carbon crumb, mixed with a binder of at least one polyvinyl polymer.

8. A method according to claim 1 wherein said coating free areas of said carrier are secured to said support by moulding into a synthetic plastics supporting plate of electrically insulating material selected from the group consisting of polyethylene, polyvinylchloride and polytetrafluoroethylene.

9. A method of making an electrode structure for use in an electric cell, said method comprising advancing a continuous ribbon of carrier material from a source to a coating apparatus, applying in said coating apparatus a spread of paste-like electrode material to spaced areas of said ribbon, passing said ribbon with said electrode material coating between rolls in said coating apparatus to cause said coating to be attached to said ribbon passing said coated ribbon to a folding device to fold said ribbon so that said coated areas are disposed in opposing relationship, advancing said coated ribbon to securing means, and securing the coating free folded areas of said ribbon on supporting means by said securing means.

10. A method according to claim 9 wherein said ribbon is fed continuously through said coating apparatus, said folding device and said securing means.

11. A method according to claim 9 wherein said ribbon is open mesh metal selected from the group consisting of Group IV(A) and Group V(A) metals of the Periodic Table according to Mendeleef and alloys of at least two of said metals.

12. A method according to claim 9 wherein said ribbon is of open mesh strip of a metal selected from the group consisting of titanium, tantalum, zirconium and an alloy of at least two of said metals.

13. A method according to claim 9 wherein said electrode material is a spreadable paste of electrically conducting porous material selected from the group consisting of porous carbon, porous particulate carbon and a friable carbon crumb, mixed with a binder selected from the group consisting of polythene, polyvinylchloride and polytetrafluoroethylene.

* * * * *